Sept. 6, 1938.  H. KRIWAT  2,129,009
NUT LOCKING DEVICE
Filed June 11, 1936
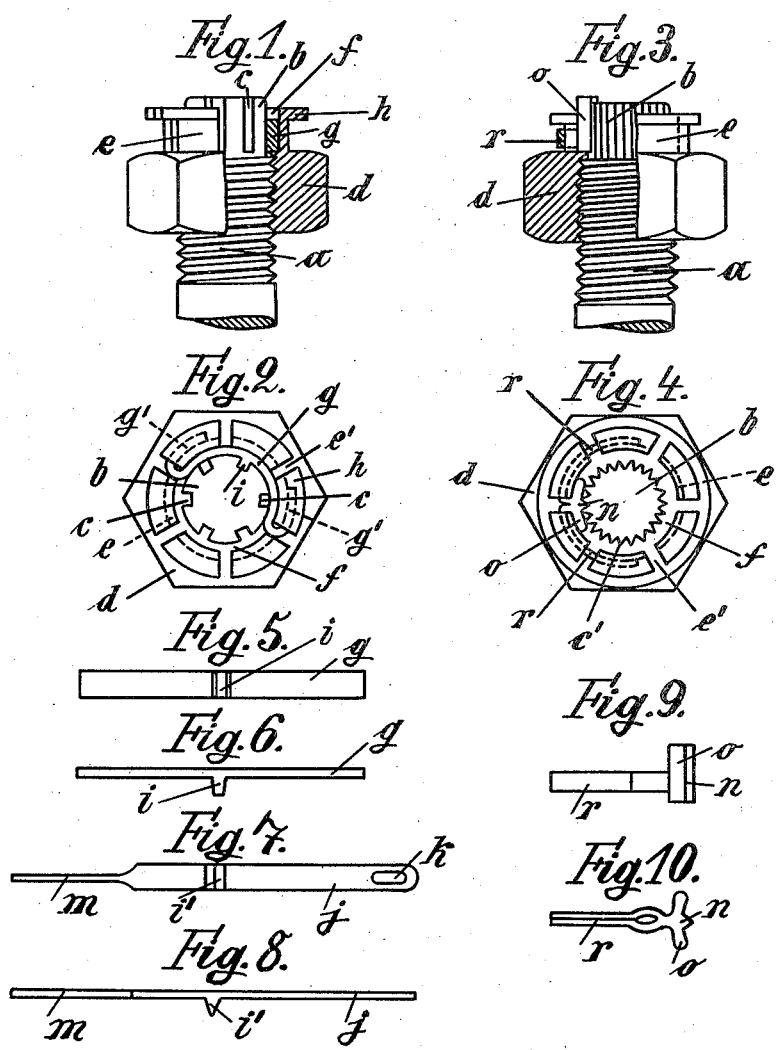

Patented Sept. 6, 1938

2,129,009

UNITED STATES PATENT OFFICE 2,129,009

NUT LOCKING DEVICE

Hans Kriwat, Brunswick-Gliesmarode, Germany

Application June 11, 1936, Serial No. 84,708
In Germany September 14, 1935

5 Claims. (Cl. 151—29)

Many types of nut locks are known, not only such in which spring ring locking elements are arranged in an annular groove in the nut designed to prevent the nut from working loose in that the edge of the inserted spring presses against the screw thread and cuts into the same, but also locking means in which a collar provided with crown slots is formed on the nut and a nose on the locking part engages in one of several axial grooves in the screw bolt. All known locking devices are open to the objection that, as in the case of spring ring locking devices, the screw thread becomes damaged and distorted by the edge of the inserted spring cutting therein, or that the axial grooves cut into the screw thread of the bolt destroy the screw thread on the portion carrying the nut. Moreover, the known locking means are open to the objection that an absolute conformity between the bolt, pin and nut is not attained so that the nut, on being subjected to abnormal shocks, may overcome the locking means and break off or bend them.

These objections are overcome by the invention. With a view to attaining this object the end of the screw bolt has a smooth extension either with axial slots or grooves, whereas the screw bolt has no grooves. The nut is provided with a collar with crown slots, an annular gap of uniform width being formed between the collar and the bolt extension of a depth equal to the height of the collar. A pin shapable by hand is inserted in this gap and its nose engages in an axial slot or groove, said pin bearing tightly against the periphery of the bolt extension and its ends are folded over under the collar. The bolt, pin and nut thus form a rigid and unyielding connection, in which automatic loosening of the nut cannot possibly occur even under strong stresses. It is possible to lock the bolt and nut in any desired position.

Two embodiments of the invention are illustrated by way of example in the accompanying drawing, in which:

Fig. 1 shows the locking device in side elevation, partly in section with axial slots in the reduced end of the bolt.

Fig. 2 is a top plan view of the device.

Fig. 3 shows in side elevation, partly in section a modified construction of the device with grooves in the reduced bolt end.

Fig. 4 is a top plan view of Fig. 3.

Fig. 5 shows in side elevation a flat pin as employed in the construction illustrated in Figs. 1 and 2.

Fig. 6 is a plan view of Fig. 5.

Fig. 7 shows a modified construction of the flat pin in side elevation.

Fig. 8 is a plan view of Fig. 7.

Fig. 9 shows in side elevation the pin employed in the form of construction illustrated in Figs. 3 and 4.

Fig. 10 is a plan view of Fig. 9.

In both forms of construction the screw threaded bolt $a$ is provided with a reduced smooth extension $b$ in which a plurality of axial slots $c$ (Fig. 2) or flutes $c'$ (Fig. 4) are formed. The nut $d$ has a collar $e$ with crown slots $e'$. There is an annular gap $f$ between the bolt extension $b$ and the collar $e$ having a uniform width on the entire height of the collar $e$ (Fig. 1).

The flat pins (Figs. 5 to 10) used for locking purposes are made of pliable, tough material. The flat pin $g$ has a sharp-edged, slightly bevelled nose $i$ (Fig. 6). It is bent into semi-circular shape and the nose $i$ is slipped into the slot $c$ which is most easily accessible (Fig. 2). The flat pin is so thick that it fills the gap between the collar and bolt (Fig. 1). The ends $g$ of the pin (Fig. 2) are bent and engage over the collar $e$ under the flange $h$, so that the pin is locked against falling out. By bending back the pin ends $g'$ the pin $g$ can easily be removed from the annular groove $f$. As it is not damaged it can be repeatedly used.

The flat pin $j$ illustrated in Figs. 7 and 8 has a nose $i'$ of triangular cross section. It has an eye $k$ at one end and a wire-like extension $m$ at the the other. The pin is of such length that, after it has been bent about the collar $e$, the extension $m$ can be threaded through the eye $k$ and knotted.

In the locking device illustrated in Figs. 3 and 4 the pin illustrated in Figs. 9 and 10 is used which consists of a rigid member $o$ with a nose $n$. The body is clamped in the annular gap $f$ between the bolt and collar so that it bears snugly against both and the nose $n$ engages in the nearest flute $c'$ in the bolt extension $b$ (Fig. 4). Two flexible arms $r$ extend from the rigid body $o$ of the pin, and these arms are clamped in one of the crown slots of the collar $e$, whereupon the two arms are bent back about the collar in the opposite direction so that the pin cannot drop out.

I claim:

1. A nut locking device comprising in combination a screw threaded bolt, a non-threaded extension on said bolt having a plurality of longitudinal flutes distributed around its periphery, and of a diameter corresponding to that of the bolt at the base of the thread, a screw threaded nut, a tubular non-threaded extension on the outer end of said nut, said extension having an internal diameter equal to that of the bolt at the apex of the thread and a plurality of slots distributed around its periphery, an outwardly directed flange on the outer end of said nut extension having apertures registering with the slots therein, a locking element, adapted to be inserted in the space formed between the inner surface of said nut extension and the periphery of said bolt extension and to bear against a portion of the periphery of said bolt extension, a nose formed on said locking element adapted to engage in one of the longitudinal flutes in said bolt extension, and flexible arms formed on said locking element adapted to extend through one of the longitudinal slots in said nut extension and to wrap around the outer side of said nut extension in opposite directions between said flange and the outer end of said nut.

2. A nut locking device as specified in claim 1 in which the longitudinal flutes are arranged directly adjacent to one another giving the bolt extension a serrated cross-sectional shape.

3. A nut locking device as specified in claim 1, in which the locking element is formed by a flexible metal strip having a projection intermediate its length forming the nose, the two ends of the strip forming the flexible arms.

4. A nut locking device as specified in claim 1, in which the locking element is formed by a flexible metal strip having a projection intermediate its length forming the nose, the two ends of the strip forming the flexible arms, one end of said strip being narrowed and the other end having an aperture adapted to receive the narrowed end when the element is folded around the nut extension.

5. A nut locking device as specified in claim 1, in which the locking element comprises a head, with a nose formed on one side and two arms projecting from the opposite side.

HANS KRIWAT.